C. DALLAS.
WRENCH.
APPLICATION FILED APR. 6, 1917.
1,237,177.
Patented Aug. 14, 1917.
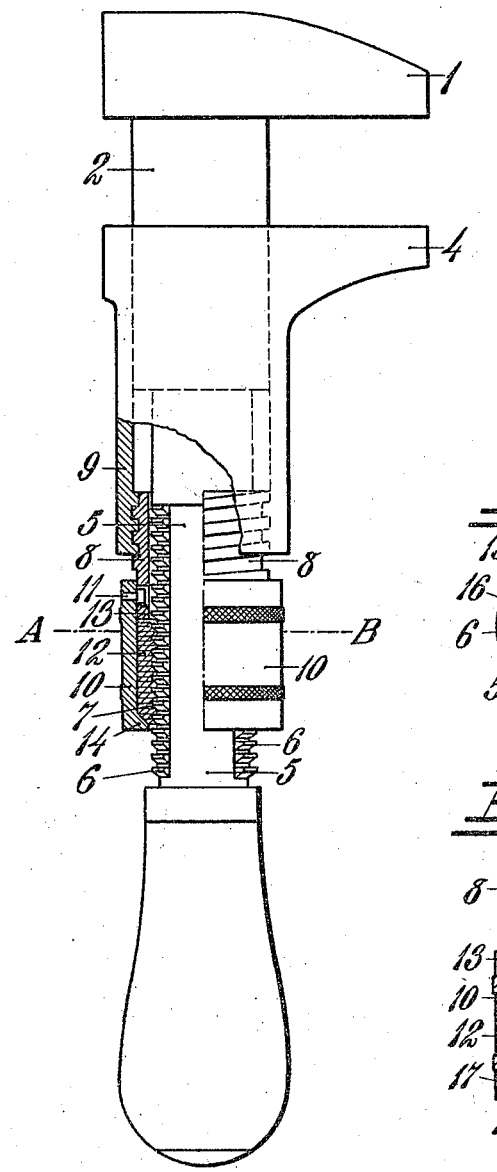
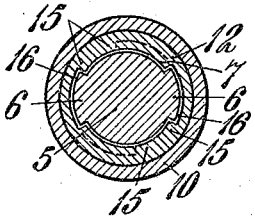
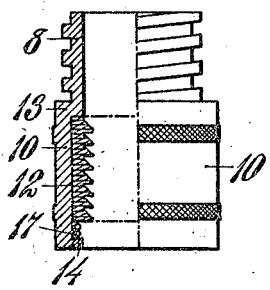
Inventor:-
Constantine Dallas
By:- B. Singer
Atty

UNITED STATES PATENT OFFICE.

CONSTANTIN DALLAS, OF PETROGRAD, RUSSIA.

WRENCH.

1,237,177. Specification of Letters Patent. Patented Aug. 14, 1917.

Application filed April 6, 1917. Serial No. 160,291.

*To all whom it may concern:*

Be it known that I, CONSTANTIN DALLAS, a subject of the Czar of Russia, residing at Petrograd, in the Empire of Russia, have invented new and useful Improvements in Wrenches, of which the following is a specification.

This invention relates to wrenches in which the adjustment of the sliding jaw is effected by an externally screw threaded adjusting sleeve on the shank of the wrench engaging in a tubular internally screw threaded extension on the sliding jaw, and has for its object to enable the wrench to be quickly adjusted to any size of nut within its range and to be securely held in the adjusted position until released.

The invention is hereinafter described with reference to the accompanying drawings in which:

Figure 1 is an elevation partly in section of a wrench constructed according to this invention.

Fig. 2 is a section taken at A—B Fig. 1, and

Fig. 3 is an elevation half in section of a modified form of adjusting sleeve.

The outer jaw 1, jaw guide 2 and shank 5 to which the handle is attached form the fixed part of the wrench, while the inner jaw 4 and its adjusting sleeve are movable on the guide 2 and shank 5.

As shown the shank 5 is formed with an interrupted screw thread 6 with which an interrupted internal thread 7 formed in an inner sleeve 12 is adapted to engage.

The inner sleeve 12 forms part of a composite adjusting sleeve which also includes an externally screw threaded part 8 arranged to engage the tubular extension 9 of the adjustable jaw 4 and an outer milled sleeve 10 mounted on the sleeve 12 and having a pin and slot connection 11 with the screw 8, so arranged as to permit the milled sleeve 10 to be moved to a small extent longitudinally in relation to the screw 8. There are preferably two pins, one of which is shown engaging in slots in the nut. It will be understood that the screw 8 is rotated by the sleeve 10.

As shown in Fig. 1 the inner sleeve 12 having the interrupted thread 7 is held in the sleeve 10 between the end 13 of the screw 8 and an internal shoulder 14 at the end of the sleeve 10 which may be conical as shown. Normally the sleeve 12 is free but an upward pressure on the sleeve 10 causes sleeve 12 to be gripped with sufficient force to turn with the sleeve 10 a slight relative movement of sleeve 10 in relation to the screw 8 being permitted by the pin and slot connection 11.

Instead of gripping the sleeve 12 by moving the sleeve 10 as described the sleeve 12 may be held by means of a spring, as for example by the helical spring 17 (shown in section in Fig. 3). In this case the screw is formed in one with the sleeve 10.

Between the screw threaded portions in the sleeve 12 are grooves or recesses 16 and when the threads 6 of the shank 5 are in these grooves the movable part of the wrench is separated from the shank and can be freely moved by hand in relation thereto to quickly adjust the movable jaw. As indicated by dotted lines in the drawing (Fig. 2) the screw threads 7 do not extend around the whole of the part between the recesses 16 so that the sleeve 12 can only be turned through a portion of a rotation on the threaded shank 5, the turning of the sleeve 12 to the left or to the right being limited by the threads 6 on the shank striking against the solid parts 15.

In use the jaws of the wrench are first adjusted against the faces of the nut or the like by turning the composite adjusting sleeves 10, 12 into the free position in which it can slide freely along the shank thus quickly bringing the movable jaw 4 into position in relation to the fixed jaw 1 where the movable jaw is held by turning the composite adjusting sleeve to engage the thread 7 with the thread 6 of the shank 5.

If it is desired to clamp the nut or the like firmly between the jaws the milled sleeve 10 and screw 8 are further rotated, to actuate the sleeve 9 and jaw 4.

To release the jaws the sleeve 10 is rotated and at the same time pressed longitudinally in the direction of the head of the wrench to rotate the inner sleeve 12 and bring the recesses 16 therein opposite the screw threads 6.

When the movable jaw of the wrench is moved against the nut or the like to be operated by pushing the outer sleeve 10 along the shank of the wrench with the hand, the pressure so applied to the outer sleeve 10 causes the inner sleeve 12 to be gripped between the shoulder 14 of the sleeve and the end 13 of the screw 8.

When the composite sleeve 10, 12, 8 is rotated being in engagement with the threaded extension 9 of the jaw 4 it would move longitudinally therein unless it were held by the threads on the shank 5.

If therefore the threads 7 are opposite the spaces between the threads 6 and as the screw thread 9 and the threads 6 and 7 are of similar pitch when the rotation takes place the threads 7 are engaged between the threads 6. Thereby the fixed and the movable parts of the wrench are coupled together and the jaws of the wrench held in the working position. On the other hand if the threads 7 are not opposite the spaces between the threads 6 as aforesaid when the sleeve 10 is rotated the threads 7 strike against the threads 6 and thereby prevent the rotation of the inner sleeve 12 but the screw 8 rotates and moves into the threaded part 9 until the threads 7 come opposite the spaces between the teeth 6 and engage therein.

In order to release the wrench or open the jaws the sleeve 10 must be rotated in the direction opposite to that for closing them and at the same time pressed toward the head of the wrench to grip the sleeve 12 which is thus rotated until the threads 7 are released from the threads 6. Further rotation in the same direction is prevented by the threads 6 striking against the projections 15 so that the inner sleeve 12 becomes stationary but the outer sleeve 10 and screw 8 however can be further rotated until the screw is brought into the starting or original position.

I claim:

1. An adjustable wrench of the type set forth comprising a fixed jaw with jaw guide and shank provided with an interrupted screw thread, a movable jaw mounted to slide on the guide and having an internally screw threaded tubular extension and a composite adjusting sleeve including an externally screw threaded part for engaging the tubular extension of the movable jaw, an outer sleeve connected with the said externally screw threaded part and an inner sleeve working in the outer sleeve and formed with an interrupted screw thread capable of coöperating with the corresponding thread on the shank of the wrench to hold the adjusting sleeve against longitudinal movement thereon or of being moved out of engagement therewith to release the sleeve to facilitate adjustment substantially as described.

2. An adjustable wrench including the element named in claim 1 and provided with means whereby said inner sleeve may be gripped and caused to rotate with said outer sleeve.

CONSTANTIN DALLAS.

Witnesses:
   T. LOGDAMOSS,
   AUG. MIGHIS.

Copies of this patent may be obtained for five cents each, by addressing the "Commissioner of Patents, Washington, D. C."